United States Patent [19]

Hanyu et al.

[11] Patent Number: 5,129,727
[45] Date of Patent: Jul. 14, 1992

[54] LIQUID CRYSTAL DEVICE HAVING THE ORIENTATION CONTROL FILMS WHICH COMPRISE A FLUORINE-CONTAINING ALIPHATIC OR ALICYCLIC POLYIMIDE AND DISPLAY APPARATUS

[75] Inventors: Yukio Hanyu; Masanobu Asaoka, both of Kanagawa, Japan

[73] Assignee: Canon Kabushiki Kaisha, Tokyo, Japan

[21] Appl. No.: 676,519

[22] Filed: Mar. 28, 1991

[30] Foreign Application Priority Data

Apr. 3, 1990 [JP] Japan .................................. 2-089402
Mar. 7, 1991 [JP] Japan .................................. 2-041800

[51] Int. Cl.⁵ .......................... G02F 1/13; C09K 19/56
[52] U.S. Cl. ....................................... 359/75; 359/85; 252/299.4
[58] Field of Search .................. 350/340, 341, 332; 252/299.65, 299.67, 299.4; 428/1; 359/75, 76, 77, 78, 85

[56] References Cited

U.S. PATENT DOCUMENTS 4,367,924  1/1983  Clark et al. ........................... 359/56
4,828,754  5/1989  Takehara et al. ................. 252/299.65
4,879,059  11/1989 Hanyu et al. ...................... 252/299.4

FOREIGN PATENT DOCUMENTS 0231781  8/1987  European Pat. Off. .
2174399  11/1986 United Kingdom .

Primary Examiner—Stanley D. Miller
Assistant Examiner—Huy K. Mai
Attorney, Agent, or Firm—Fitzpatrick, Cella, Harper & Scinto

[57] ABSTRACT

A ferroelectric liquid crystal device and apparatus having a pair of substrates with orientation control films of a fluorine-containing aliphatic polyimide or a fluorine-containing alicyclic polyimide. The fluorine-containing aliphatic polyimide or alicyclic polyimide has a structural unit expressed by the following general formula [1]:

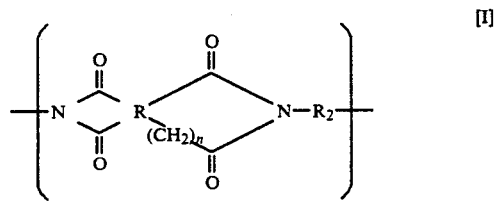

wherein $R_1$ is a tetravalent organic residue and $R_2$ is a divalent organic residue, at least one of $R_1$ and $R_2$ being an alicyclic or aliphatic organic residue containing fluorine and n is 0 or 1.

28 Claims, 12 Drawing Sheets

LIQUID CRYSTAL DEVICE HAVING THE ORIENTATION CONTROL FILMS WHICH COMPRISE A FLUORINE-CONTAINING ALIPHATIC OR ALICYCLIC POLYIMIDE AND DISPLAY APPARATUS

BACKGROUND OF THE INVENTION

1. Field of the Invention

The present invention relates to a liquid crystal device for use, for example, in a display apparatus, liquid crystal-optical shutter device and the like. More particularly, the present invention relates to a liquid crystal device which provides enhanced display performance by attaining a specific state of orientation of the liquid crystal molecules.

2. Description of the Related Arts

A liquid crystal display device has been proposed by Clark and Lagerwall in U.S. Pat. No. 4,367,924, in which light transmission is controlled by a combination of a liquid crystal element and a polarizing element by using the anisotropy of refractive index exhibited by ferroelectric liquid crystal molecules. This type of liquid crystal device is also disclosed, for example, in Japanese Laid-Open Patent Application Serial No. 56-107216. The ferroelectric liquid crystal used in this device generally exhibits non-spiral chiral smectic C (SmC*) or H (SmH*) phases within a specific temperature range. The liquid crystal has bistable characteristic: namely, it assumes either one of first and second optically stable states in response to the polarity of a sufficiently large application of an electric field and maintains such optically stable state even after electric field is discontinued. This liquid crystal also respond quickly to a change in the applied electric field. Accordingly, non-liquid crystals are expected to have a wide range of applications in the field of both high-speed and memory type display devices. These liquid crystals are also considered to be promising for use in large-area image displays which require a high degree of detail.

The transmittance of a liquid crystal device utilizing double refraction of a liquid crystal, under conventional conditions of crossed nicols, is expressed by the following formula:

$$I/I_0 = \sin^2 4\theta_0 \sin^2 (\Delta nd/\lambda)\pi$$

where $I_0$ represents intensity of incident light, I represents intensity of transmitted light $\theta$ represents tilt angle, $\Delta n$ represents refractive anisotropy, d represents the thickness of liquid crystal layer and $\lambda$ represents wavelength of the incident light. In liquid crystal having non-spiral structure, the tilt angle $\theta$ is the angle of the mean molecular axis direction of the liquid crystal molecules arranged in each of the first and second stable states.

According to the formula shown above, the transmittance is maximized when the tilt angle $\theta$ is 22.5°. From this point of view, it is desirable that the tilt angle in bistable spiral structure is as close to 22.5° as is possible.

In order to obtain the desired driving characteristics for optical modulating elements incorporating this bistable liquid crystal, it is necessary that the liquid crystal interposed between a pair of parallel substrates have a molecular alignment such that the two stable states are reversibly changed effectively caused irrespective of the state of application of the electric field. Although various methods for orienting ferroelectric liquid crystal are known, the preferred orientation process is a simple rubbing process which enables the layer of smectic liquid crystal molecules to be uniaxially oriented along a normal line over a large area and which also can simplifies the production process. A suitable method for orienting ferroelectric liquid crystals, in particular, non-spiral chiral smectic liquid crystals, is proposed in U.S. Pat. No. 4,561,726 among others.

The following two problems are encountered when a known orientation method, in particular the orientation method non-spiral ferroelectric liquid crystal proposed by Clark and Lagerwall. The first problem pertains to the tilt angle of the ferroelectric liquid crystal having the non-spiral structure.

The inventors have found through experiment that the tilt angle $\theta$ (which will be explained in connection with FIG. 3 below) in non-spiral ferroelectric liquid crystal oriented with a conventional rubbed polyimide film is smaller than the tilt angle $\Theta$ (which is half the apex angle of pyramid explained in connection with FIG. 2 below) of spiral ferroelectric liquid crystal. More specifically, it was confirmed that the tilt angle $\theta$ in non-spiral ferroelectric liquid crystal oriented with a conventional rubbed polyimide film generally ranges between 3° and 8° and the transmittance is as low as 3 to 5%.

According to Clark and Lagerwall, the tilt angle $\Theta$ of a bistable non-spiral ferroelectric liquid crystal should be equal to tilt angle $\Theta$ of a spiral ferroelectric liquid crystal. In practice, however, the spiral angle $\theta$ in non-spiral structure is less than the tilt angle $\Theta$ in spiral structure. Moreover the fact that tilt angle $\theta$ is less than title angle $\Theta$ is attributable to the twisting arrangement of the non-spiral liquid crystal molecules. That is, non-spiral ferroelectric liquid crystal molecules are arranged in a continuous twist with respect to the line normal to the substrates, from the direction of the molecule axis of the molecules adjacent the upper substrate to the direction of the molecule axis of the molecules adjacent the lower substrate.

The second problem pertains to an afterimage which is observed in an image display using a ferroelectric liquid crystal having a non-spiral structure.

In general, an image display apparatus employs a rubbed polyimide orientation film between chiral smectic liquid crystal layer and electrodes serving as an insulating layer. When a switching voltage of one polarity is applied between the electrodes in order to switch the liquid crystal from a first optically stable state (e.g., white state to a second optically stable state (e.g., black state a reverse electric field Vrev of the reverse polarity is generated in the ferroelectric layer after the switching voltage is terminated. This reverse electric field Vrev causes an undesirable afterimage on the display. The detail of the mechanism of generation of the reverse electric field is detailed in, for example, Akio Yoshida, October, 1987, SWITCHING CHARACTERISTIC of SSFLC, pp 142-143, the subject matter of which is hereby incorporated by reference. Briefly, however, the reverse electric field is generated by switching characteristic of SSFLC.

SUMMARY OF THE INVENTION

Accordingly, an object of the present invention is to provide a liquid crystal device which simultaneously overcomes the two problems of the prior art described above, as well as a display apparatus incorporating such a liquid crystal device.

Another object of the present invention is to provide a liquid crystal device using a ferroelectric liquid crystal having a large tilt angle θ in non-spiral structure of chiral smectic liquid crystal so as to enable image display with a high contrast while eliminating formation of any afterimage, as well as a display apparatus making use of such a liquid crystal device.

The present invention achieves these objects and others by providing a liquid crystal device having a pair of substrates having orientation control films and an intermediate ferroelectric liquid crystal layer disposed between the substrates, wherein each of said orientation control film is made of a fluorine-containing aliphatic polyimide or a fluorine-containing alicyclic polyimide. The invention also relates to a display apparatus incorporating this liquid crystal device.

In a preferred form of the present invention, the fluorine-containing aliphatic polyimide or alicyclic polyimide has a structural unit expressed by the following general formula [I]:

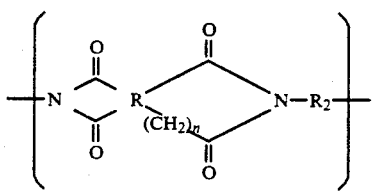

wherein $R_1$ is a tetravalent organic residue and $R_2$ is a divalent organic residue, at least one of $R_1$ and $R_2$ includes an alicyclic or aliphatic organic residue having fluorine and n is 0 or 1.

DESCRIPTION OF THE PREFERRED EMBODIMENTS

Figure 1:
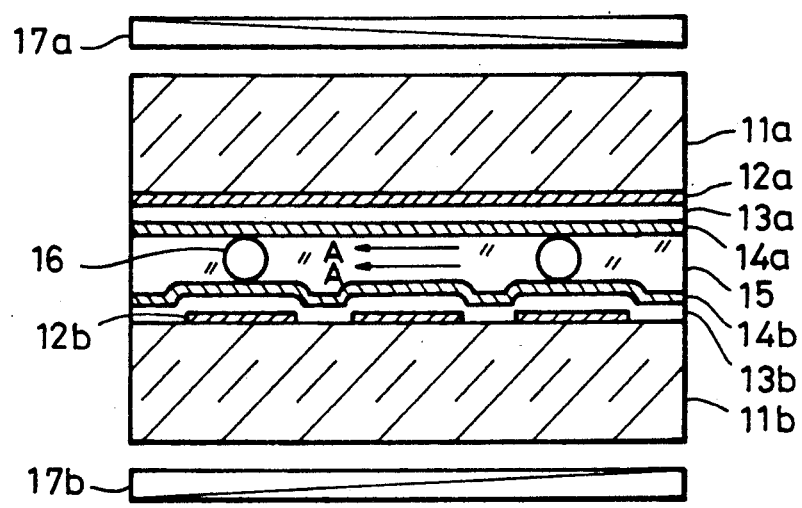
FIG. 1 is a schematic sectional view of a liquid crystal device in accordance with the present invention.

In FIG. 1, the liquid crystal cell in accordance with the present invention has glass plate substrates 11a and 11b covered by transparent electrodes 12a and 12b made of $In_2O_3$ or ITO (Indium Tin Oxide). Insulating films 13a and 13b of $SiO_2$, $TiO_2$ or $Ta_2O_5$ having a thickness of 200 Å to 1000 Å are laminated on the transparent electrodes 12a and 12b, respectively, and orientation films 14a and 14b of 50 Å to 1000 Å thickness of polyimide represented by the aforementioned general formula, are laminated to the insulating films 13a and 13b, respectively. The orientation control films 14a and 14b have been subjected to a rubbing treatment conducted in the same parallel direction, e.g., in the direction of arrows A in FIG. 1.

A ferroelectric smectic liquid crystal 15 is placed between the substrates 11a and 11b. The distance between the substrates 11a and 11b is selected to be sufficiently small so as to suppress formation of spiral structure of the ferroelectric smectic liquid crystal 15, e.g., from 0.1 μm to 3 μm. The liquid crystal 15 is thus held in a bistable orientation state. The above-mentioned small distance is conventionally preserved by bead spacers 16 such as silica or alumina beads disposed between the substrates 11a and 11b.

The present inventors have confirmed generally that an orientation method using a specific rubbed polyimide orientation film can provide an orientation state which generates a large optical contrast between bright and dark states. In particular, the inventors determined that a large optical contrast is obtained between selected and non-selected pixels of the multiplexing driving method disclosed in U.S. Pat. No. 4,655,561, while eliminating any delay of optical response to, thereby obviating generation of afterimage.

The polyimide film used in the present invention can be obtained by preparing a polyamide acid through a condensation reaction between a carboxylic acid anhydride and diamine, and heating the polyamide acid so as to close the cycle.

In the present invention, compounds of the following groups A and B, for example are usable as the carboxylic acid anhydridge:

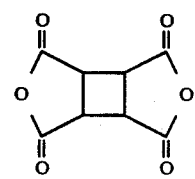

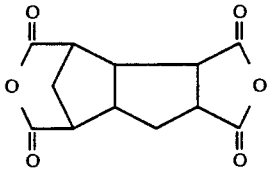

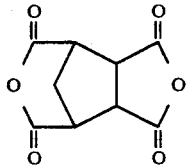

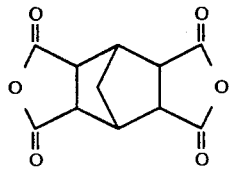

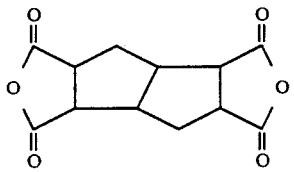

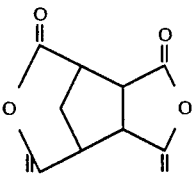

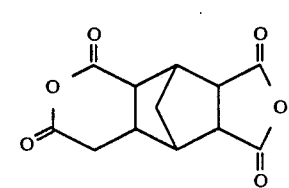

Group B

Flourine-containing carboxylic acid anhydrides such as those shown below:

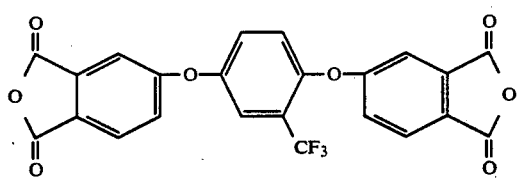

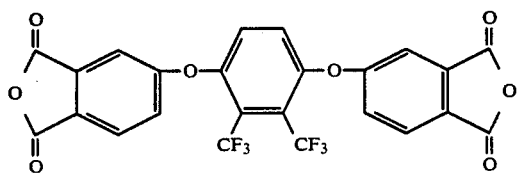

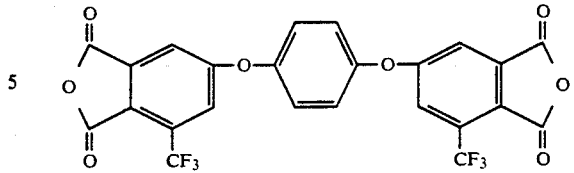

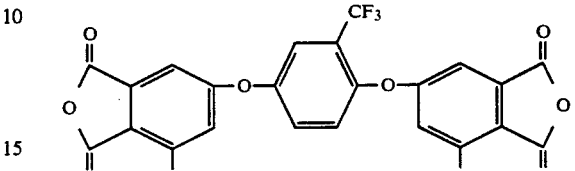

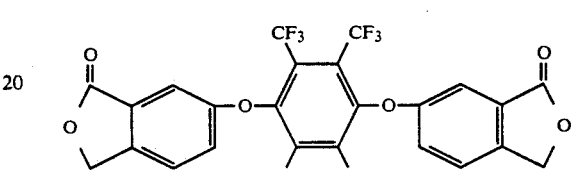

On the other hand, compounds of the following groups C and D, for example, are usable as the diamine in the present invention:

Group C 1,4-diaminicyclohexane
$NH_2-H-NH_2$
$NH_2-H-CH_2-H-NH_2$
$NH_2-CH_2-CH_2-NH_2$
ethylene diamine

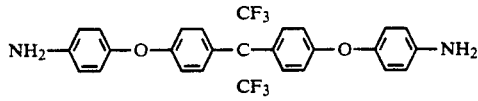

Group D

Fluorine-containing diamines such as:

2, 2-bis[4-(3-aminophenoxy)phenyl]hexafluoropropane; 2, 2-bis[4-(2-amonophenoxy)phenyl]hexafluoropropane; 2, 2-bis[4-(2-aminophenoxy-3, 5-dimethylphenyl]hexafluoropropane; p-bis(4-amino-2-trifluoromethylphenoxy)benzene; 4, 4'-bis(4-amino-2-trifuoromethylphenoxy)biphenyl; 4, 4'-bis(4-amino-2-trifluoromethylphenoxy)diphenylsulfone; 4, 4'-bis(3-amino-5-trifluoromethylphenoxy)diphenylsulfone; 2, 2-bis[4-(4-amino-2-trifluoromethylphenoxy)phenyl]hexafluoropropane; and 4,4'-bis[(4-aminophenoxy)phenyl]hexafluoropropane , The polyimide film used in the present invention may be formed by using two or more of the aforementioned carboxylic acid anhydrides and/or two or more of the aforementioned diamines.

It is also possible to use, as the material of the polyimide film, copolymeric condensates formed by combining a carboxylic acid selected, for example, from the following group E or a diamine selected, for example, from the following group F with the aforesaid carboxylic acid anhydride and diamine.

Group E thiophene-2, 3, 4, 5-tetracarboxylic acid anhydride; 2, 2-bis(3, 4-biscarboxyphenyl)propane anhydride; 3, 4-dicarboxyphenylsulphone anhydride; perylene-3, 4, 9, 10-tetracarboxylic acid anhydride; bis(3, 4-dicarboxyphenyl)ether anhydride; and 3, 3', 4, 4'-benzophenone tetracarboxylic acid anhydride

Group F m-phenylenediamine; p-phenylenediamine; m-xylenediamine; p-xylenediamine; 4, 4'-diaminodiphenylether; 4, 4'-diaminodiphenylmethane; 3, 3'-dimethyl-4, 4'-diaminodiphenylmethane, 3, 3', 5, 5'-tetramethyl-4, 4'-diaminodiphenylmethane; 2, 2'-bis(4-aminophenyl)-propane,4, 4'-methylenedianiline; benzine; 4, 4'-diaminodiphenylsulfide; 4, 4'-diaminophenylsulfone; 1, 5-diaminonaphthalene; and 3, 3'- dimethylbenzine; 3, 3'-dimethoxybenzine Since it is noted that the polyimide used in the invention is characterized by containing fluorine, it is therefore preferred that the polyimide is formed using at least one of fluorine-containing carboxylic acid anhydride and fluorine-containing diamine. It is also essential that the polyimide used in the present invention has an alicyclic organic residue or an aliphatic organic residue.

Examples of polyimide which can be used in the present invention are shown by the following Formulae [Ia] to [Ig].

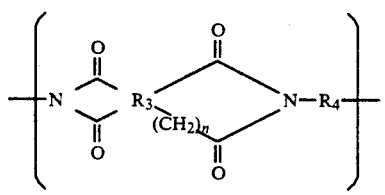
[Ia]

wherein $R_3$ is an aliphatic group and $R_4$ is an aromatic group, at least one of $R_3$ and $R_4$ containing fluorine and n is 0 or 1.

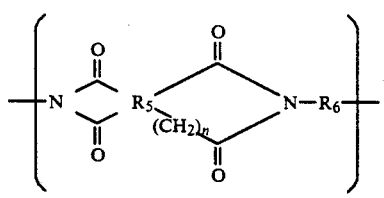
[Ib]

wherein $R_5$ is an aromatic group and $R_6$ is an aliphatic group, at least one of $R_5$ and $R_6$ containing fluorine, n being 0 is 1.

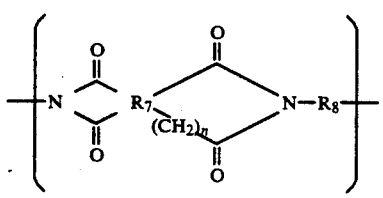
[Ic]

wherein $R_7$ is an aromatic group and $R_8$ is an alicycle, at least one of $R_7$ and $R_8$ containing fluorine and n is 0 or 1.

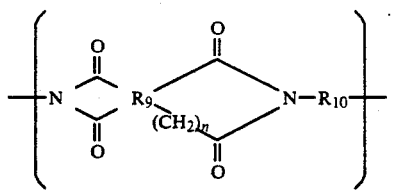
[Id]

wherein $R_9$ is a alicycle and $R_{10}$ is an aromatic group, at least one of $R_9$ and $R_{10}$ containing fluorine and n is 0 or 1.

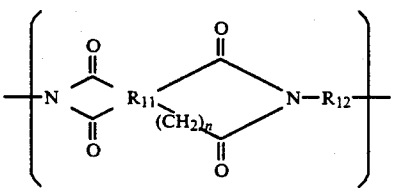
[Ie]

wherein $R_{11}$ and $R_{12}$ are aliphatic groups, at least one of $R_{11}$ and $R_{12}$ containing fluorine and n is 0 or 1.

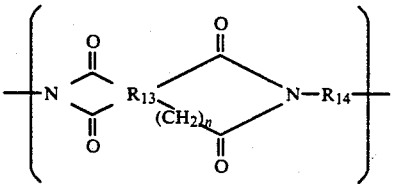
[If]

wherein $R_{13}$ is an aliphatic group, and $R_{14}$ is an alicycle, at least one of $R_{13}$ and $R_{14}$ containing fluorine and n is 0 or 1.

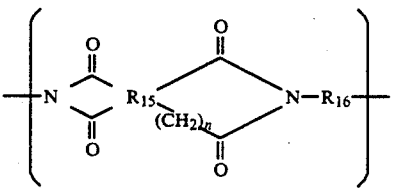
[Ig]

wherein $R_{15}$ is an alicycle, and $R_{16}$ is an aliphatic group, at least one of $R_{13}$ and $R_{14}$ containing fluorine and n is 0 or 1.

The diamine used in the preparation of the polyamide acid in the present invention is used in an amount of 0.1 to 10 weight parts, preferably 1 weight part for 1 weight part of tetracarboxylic acid anhydride.

The polyimide used in the present invention can have a mean molecular weight of 10,000 to 100,000, preferably 30,000 to 70,000, more preferably 50,000.

According to the present invention, the polyimide film is formed on each substrate of the liquid crystal device using a coating solution prepared by dissolving polyamide acid as a precursor of polyimide in a solvent such as dimethylformamide, dimethylacetoamide, dimethylsulfoxide or N-methylpyrrolidone. The concentration of the polyamide acid in the solution is preferably from 0.01 to 40 wt%. . THe polyimide films can be formed by applying a solution of the polyimide on the substrate by a spinner coating method, spray coating method, roll applicator method or the like and heating substrate bearing the solution at a temperature of 100° to 350° C., preferably 200° to 300° C., so as to dehydrate the solution and close the cycles thereby forming the polyimide film. The polyimide film is then rubbed with a cloth or the like. The polyimide film used in the present invention has a thickness of 30 Å to 1 μ. The insulating films 13a and 13b shown in FIG. 1 may be omitted, wherein the polyimide films are preferably 200 Å to 2000 Å. However, when the polyimide films are formed on such insulating films 13a and 13b, the thickness of the polyimide film may preferably be from 30 Å to 200 Å.

Preferably, the liquid crystal used in the present invention is one that changes its state to chiral smectic phase sequentially via isotropic, cholesteric and smectic A phases in accordance with decreasing temperature. More preferably, the liquid crystal used in the invention has a pitch of at least 0.8 μm in its cholesteric phase as measured at the central temperature of the cholesteric phase temperature range. More specifically, the following liquid crystals are suitably used in the present invention.

Liquid Crystals (1) (LC-1)$_{90}$/(80B)$_{10}$
(2) (LC-1)$_{80}$/(80B)$_{20}$
(3) (LC-1)$_{70}$/(80B)$_{30}$
(4) (LC-1)$_{60}$/(80B)$_{40}$
(5) (80SI*)
(6) (CS1014) (commercial name, produced by Chisso Corporation)

(LC-1), (80B) and (80SI*) are optically active ester type ferroelectric liquid crystals. Suffixes show weight percents.

Figure 2:
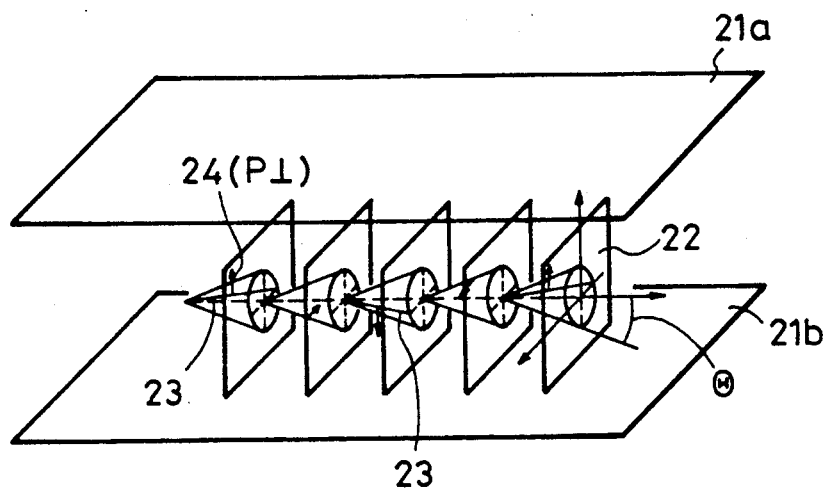
FIG. 2 is a perspective view of a liquid crystal illustrative of the state of orientation of a chiral smectic liquid crystal having a spiral structure.

FIG. 2 is a schematic illustration of a liquid crystal cell illustrative of the operation of a ferroelectric liquid crystal wherein 21a and 21b denote substrates coated with transparent thin film electrodes. Between the transparent electrodes is charged a liquid crystal of an SmC* (chiral smectic C) phase or SmH* (chiral smectic H) phase oriented such that the liquid crystal molecule layers 22 extend perpendicularly to the glass surfaces. Thick lines 23 represent the liquid crystal molecules and 24 denotes a bipolar moment (P⊥) 24 acting in the direction perpendicular to the molecule. When a voltage exceeding a predetermined threshold level is applied between the electrodes on the substrates 21a and 21b, the spiral structure of the liquid crystal molecules 23 is loosened and the liquid crystal molecules 23 reorient such that the bipolar moments (P⊥) 24 of the molecules are aligned in the direction of the electric field. The liquid crystal molecule 23 has an elongated form and has a refractive anisotropy, i.e., different refractive index values in the directions of the longer and shorter axes thereof. Therefore, it is possible to obtain a liquid crystal optical modulating element which varies its optical characteristic according to the polarity of the applied voltage by placing, for example, cross-nicol polarizers on the upper and lower sides of the cell.

Figure 3:
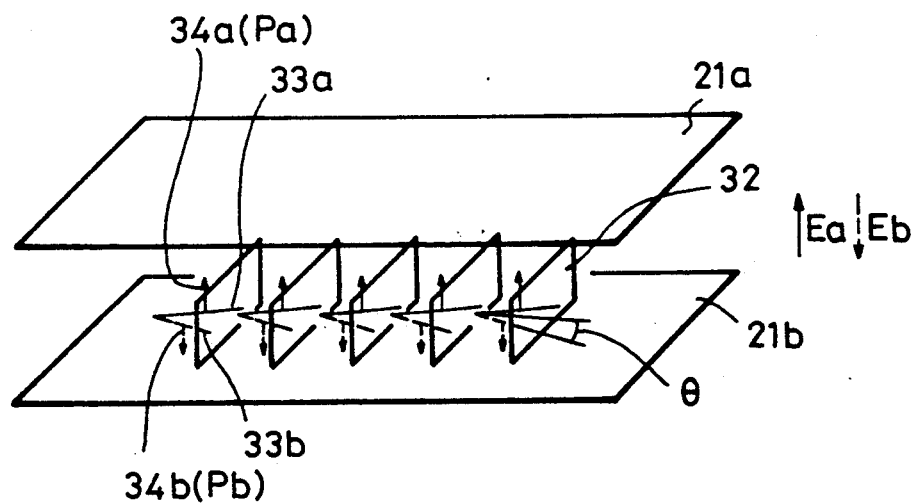
FIG. 3 is a perspective view of a liquid crystal illustrative of the state of orientation of a chiral smectic liquid crystal having a non-spiral structure.

The surface stable type ferroelectric liquid crystal cell which is oriented in bistable state and which is used in the liquid crystal device of the present invention can have a very small thickness of, for example, 0.1 μm to 3 μm. As the thickness of the liquid crystal layer is reduced, the spiral structure of the liquid crystal molecules is loosened so that a non-spiral structure is obtained even in the absence of the electric field, as shown in FIG. 3. In this state, the bipolar moment P or P' is directed either upward as denoted by 34a or downward as denoted by 34b. When an electric field Ea or Eb (Ea and Eb being of opposite polarities) exceeding a predetermined threshold level is applied to the cell by the voltage applying means 31a and 31b shown in FIG. 3, the bipolar moment is directed upward (as denoted by 34a) or downward (as denoted by 34b), whereby the liquid crystal molecules are oriented either to a first stable state 33a or the second stable state 33b.

This ferroelectric liquid crystal cell offers two major advantages including a very high response speed as well as the bistable nature of the liquid crystal orientation, discussed below. In this regard, with reference to FIG. 3, when the electric field Ea is applied, the liquid crystal molecules are oriented to the first stable state 33a which state is stably maintained even after the application of the electric field Ea is terminated. Similarly, when the electric field Eb of the reverse polarity is applied, the liquid crystal molecules are oriented to the second stable state 33b, which state is maintained stably even after termination of the electric field Eb. Additionally, each stable orientation state is generally maintained even when a voltage of a reverse polarity is applied, provided that the level of such voltage is below the predetermined threshold level.

Figure 4:
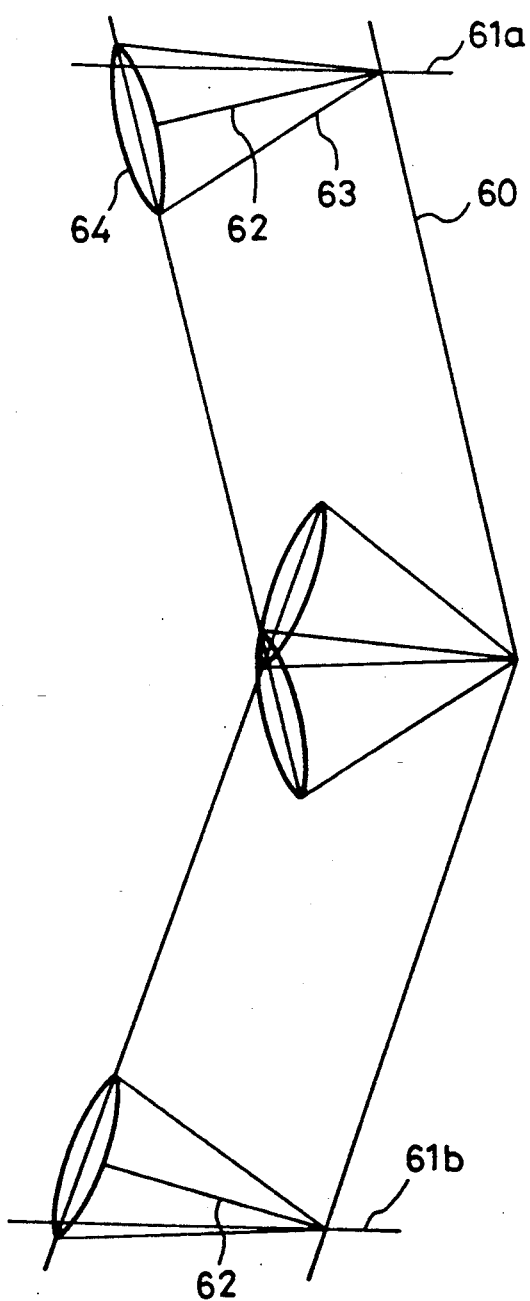
FIG. 4(A) is a sectional view of a chiral smectic liquid crystal oriented in accordance with the present invention.
FIG. 4(B) is a chart showing C director in a uniform orientation state of the chiral smectic liquid crystal shown in FIG. 4.
FIG. 4(C) is a chart showing C director in a spray orientation state of the chiral smectic liquid crystal shown in FIG. 4.
Figure 4B:
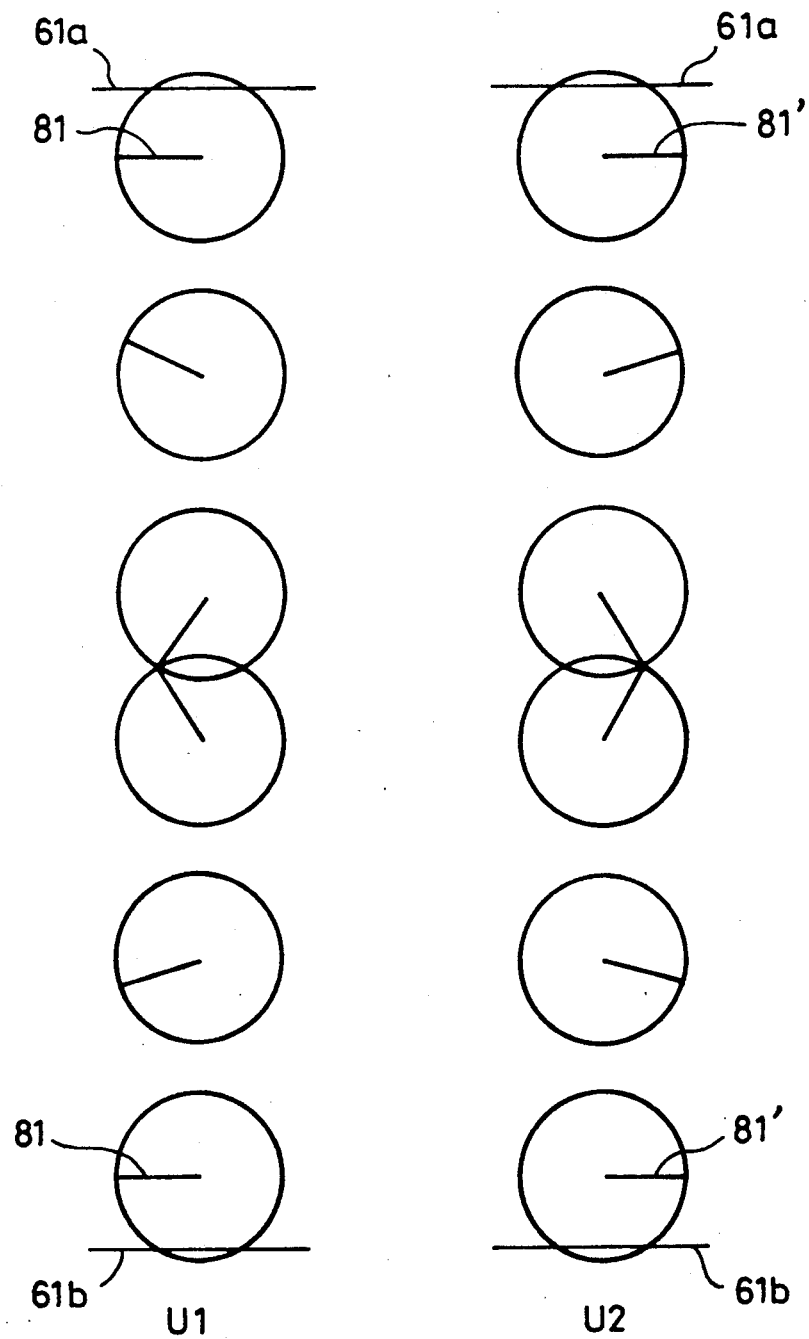

FIG. 4A is a schematic sectional view illustrating the state of orientation of liquid crystal molecules generated in the orientation direction in accordance with the present invention, while FIG. 4B is a chart showing the directions of C-directors. In FIG. 4A, numerals 61a and 61b respectively denote upper and lower substrates and 60 designates a molecule layer composed of liquid crystal molecules 62. It is seen that the liquid crystal molecules 62 are arranged such that their positions vary along the circular bottom 64 of cone 63.

Referring now to FIG. 4B, U$_1$ represents a C-director 81 in one of two stable orientation states, while U$_2$ represents a C-director 81' in the other stable orientation state. The C-directors 81 and 81' are the projection of the molecule longer axis on an imaginary plane which is perpendicular to the line normal to the molecule layer 60 shown in FIG. 4A.

Figure 4C:
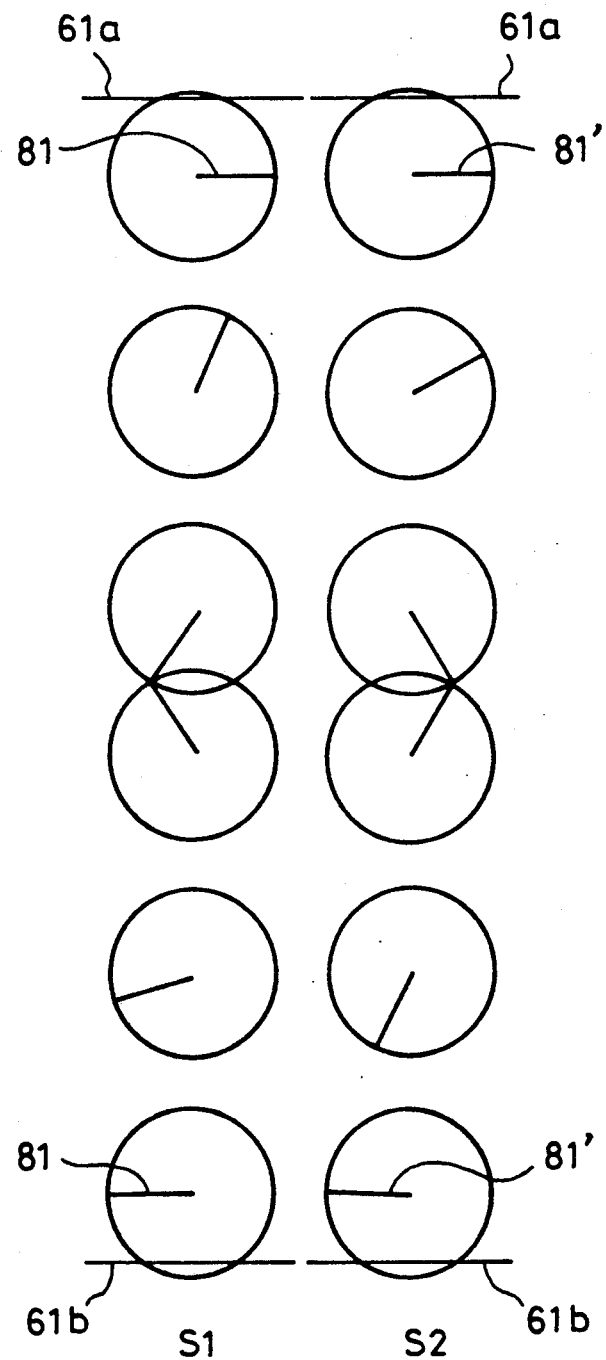

FIG. 4C is a C-director chart showing the state of orientation of a rubbing-treated polyimide. In the orientation state shown in FIG. 4C, the tilt angle θ is small because the molecule axes are generally twisted between the upper and lower substrates 61a and 61b.

Figure 5A:
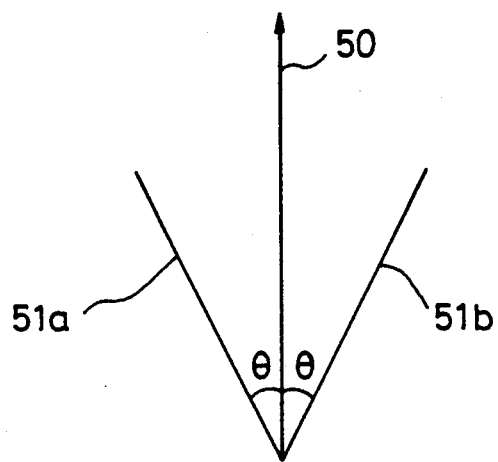
FIG. 5(A) is a plan view indicative of the tilt angle θ in a uniform orientation state.
Figure 5B:
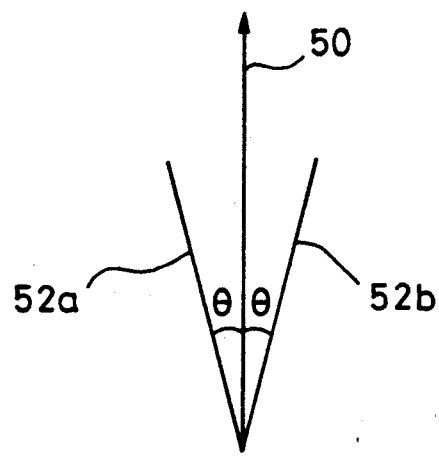
FIG. 5(B) is a plan view indicative of the tilt angle θ in a spray orientation state.

FIG. 5A is a plan view illustrative of the tilt angle θ when the C-director 81 is in the state shown in FIG.4B hereinafter referred to as the "uniform orientation state", while FIG. 5B is a plan view illustrative of the tilt angle θ when the C-director 81 is in the state shown in FIG.4C hereinafter referred to as the "spray orientation state". In FIGS. 5A and 5B, numeral 50 designates the axis of rubbing treatment conducted on a specific polyimide film which meets the condition specified by the invention. Numerals 51a and 51b respectively denote the mean molecular axes in the orientation states U$_1$ and U$_2$. Numerals 52a and 52b respectively denote the mean molecular axes in the orientation states S$_1$ and S$_2$ which switch interchangeably upon the application of threshold-exceeding voltages having opposite polarities, as do the mean molecular axes 51a and 51b.

The uniform orientation state is effective to eliminate of delay in the optical response caused by generation of the reverse electric field Vrev which causes an after image as follows:

$$V_{rev} = 2 \cdot P_S / (C_i + C_{LC})$$

wherein the capacitance of the insulating layer (orientation control film) being given by $C_i$, the capacitance of the liquid crystal layer being given by $C_{LC}$ and the spontaneous polarization of the liquid crystal being given by by $P_S$.

$$V_{rev} = 2 \cdot P_S / (C_i + C_{LC})$$

Figure 6A:
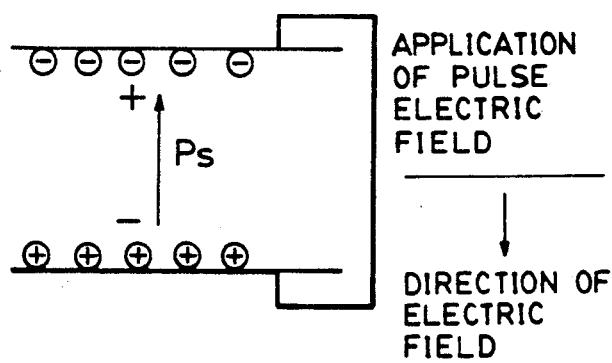
FIGS. 6A-6C are schematic sectional views respectively showing the charge distribution, direction of spontaneous polarization Ps and the direction of reverse electric field Vrev in a ferroelectric liquid crystal.
Figure 6B:
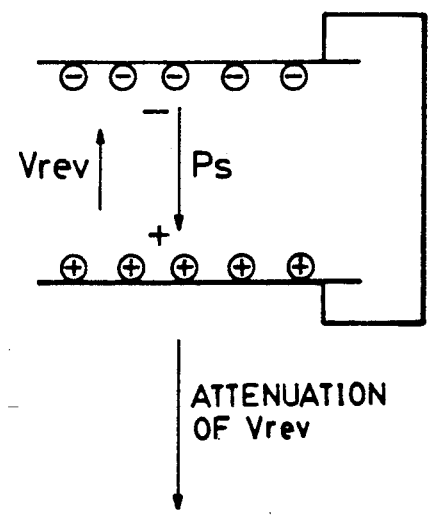
Figure 6C:
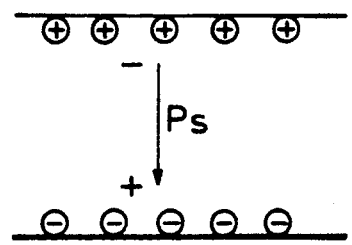

The sectional views of FIGS. 6A, 6B and 6C schematically show the distribution of charges in the liquid crystal cell, the direction of spontaneous polarization Ps and the direction of the reverse electric field. More specifically, FIG. 6A shows the state of distribution of (+) and (−) charges in the memory state before the application of a pulse electric field. In this state, the spontaneous polarization is directed from (+) charges towards (−) charges. In FIG. 6B, the direction of spontaneous polarization Ps is directed in the direction reverse to that in FIG. 6A since the liquid crystal molecules have been inverted from one stable orientation state to the other stable orientation state. Therefore, in the state shown in FIG. 6B, the (+) and (−) charges are distributed in the same manner as that shown in FIG. 6A, so that a reverse electric field Vrev is formed as indicated. After a while, this revere electric field Vrev is extinguished and the state of distribution of (+) and (−) charges becomes as shown in FIG. 6C.

Figure 7:
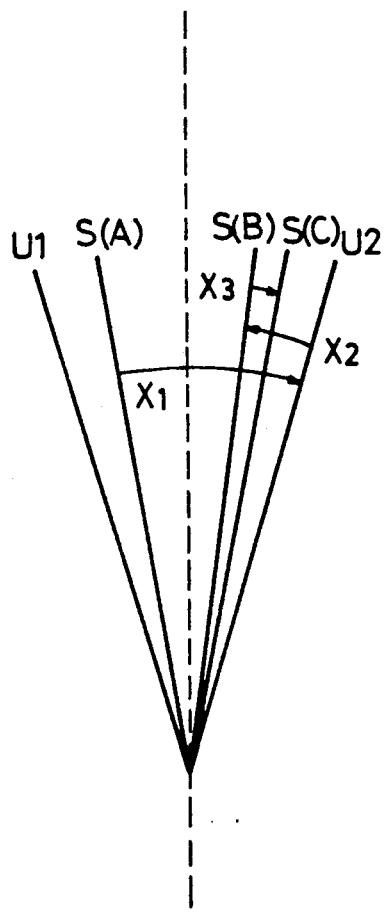
FIG. 7 is a plan view showing the change in the tilt angle θ caused by application of an electric field.
Figure 8:
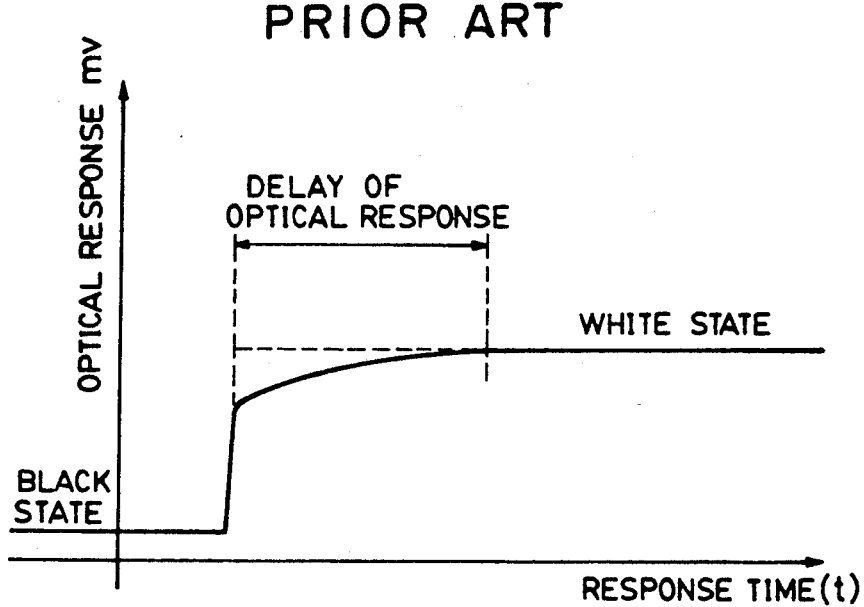
FIG. 8 illustrates the optical response characteristic of a conventional liquid crystal display device.

FIG. 7 shows a change in the optical response of the liquid crystal in spray orientation state generated by a conventional polyimide orientation film, in terms of a change in the tilt angle $\theta$. As shown in FIG. 7, when a pulse electric field is applied, the liquid crystal material orientation respond as indicated by an arrow $X_1$ from the angle of the mean molecule axis S(A) in the spray orientation state "over-shooting" to the angle of the mean molecule axis $U_2$ of uniform orientation state near the maximum tilt angle $\Theta$. Immediately after the interruption of the pulse electric field, the tilt angle $\theta$ is reduced to the angle of the mean molecule axis S(B) of spray orientation state as indicated by an arrow $X_2$ by the action of the reverse electric field Vrev. By the attenuation of the reverse electric field Vrev shown in FIG. 6C, a stable orientation state is obtained in which the tilt angle $\theta$ is increased slightly to the angle of the mean molecule axis S(C) of the spray orientation state as indicated by an arrow $X_3$. The optical response characteristic achieved by the above-described behavior is shown in FIG. 8.

Figure 9:
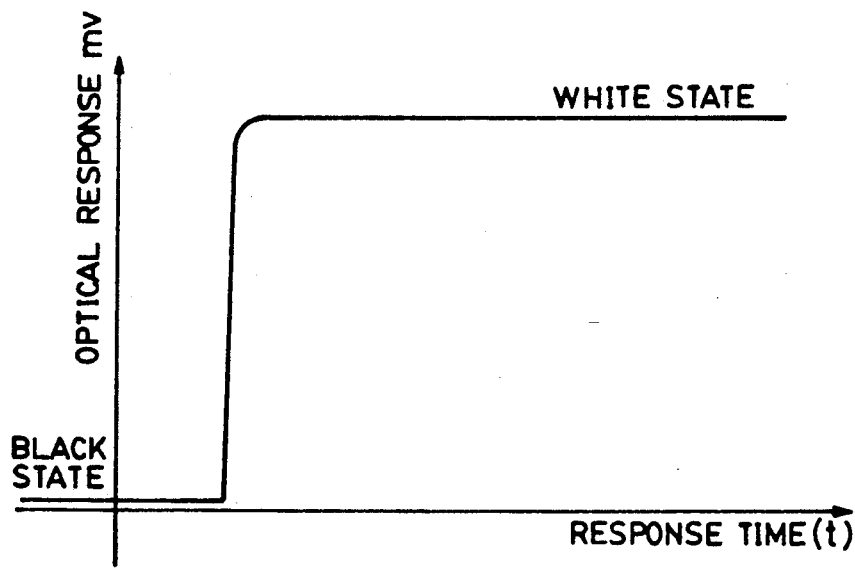
FIG. 9 illustrates the optical response characteristic of a liquid crystal device of the present invention.

According to the present invention, the orientation provided by the effect of the aforementioned fluorine-containing polyimide film precludes the generation of the mean molecule axes S(A), S(B) and S(C) of in FIG. 7, so that the molecules can be oriented to have such a mean molecule axis that produces a tilt angle $\theta$ approximating the maximum tilt angle $\Theta$. The optical response characteristic of the liquid crystal device of the present invention having the above-mentioned feature is shown in FIG. 9. From FIG. 9, it will be understood that the liquid crystal device does not suffer from any delay in the optical response from which an afterimage is generated, and that the liquid crystal device of the present invention provides a display with a high contrast.

Examples of the present invention follow.

EXAMPLE 1

A pair of glass sheets substantially having thicknesses of 1.1 mm thick, were each being coated with an ITO film of 1000 Å thick. A 3.0 wt% solution of the polyamide acid shown below (molecular weight 50,000) was prepared by dissolving the same in a mixture of N-methylpyrrolidone and n-butylcellosolve mixed in a ratio of 5:1. The solution was applied to each glass sheet by spin coating at 3000 rpm for 30 seconds.

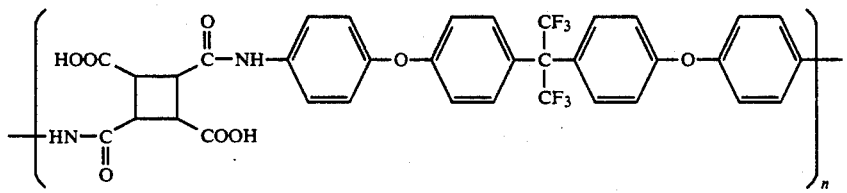

After the application of the solution, a 1-hour baking was conducted at 250° C., whereby a film of 450 Å thickness was formed. A unidirectional rubbing treatment was then conducted on the film using a cloth with nylon wires.

Subsequently, alumina beads of a mean particle size of 1.5 μm were sprayed on one of the glass sheets and the pair of substrates were superposed such that the directions of the axes of rubbing treatments on both substrates are parallel to and in the same direction as each other, thus forming a cell structure.

The cell was then charged with the ferroelectric smectic liquid crystal "CS-1014" (discussed previously) in an isotropic phase by vacuum injection. The liquid crystal was cooled slowly from the isotropic phase temperature at a rate of 0.5° C./h down to 30° C. whereby the liquid crystal was oriented. More specifically, the liquid crystal "CS-1014" used in the liquid crystal cell of this example showed the following phase change.

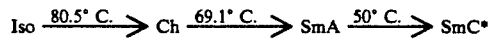

wherein Iso represents isotropic phase, Ch represents cholesteric phase, SmA represents smectic A phase and SmC* represents chiral smectic C phase.

The thus formed liquid crystal cell was sandwiched between a pair of cross-nicol polarizing elements and a 50 μsec pulse of 30 V was applied to the liquid crystal cell while the 90° cross-nicol was set to darkest (light extinction) state. The light transmittance of the liquid crystal cell in this state was measured with a photomultiplator and a 50 μsec pulse of −30V was then applied to realize a bright state and the transmittance in this state was again measured by the same method. It was confirmed that the tilt angle was 15° and the values of transmittance in the darkest and the bright states were respectively 0.9% and 45%, thus providing a contrast ratio of 50:1. The delay of optical response which results in the generation of an afterimage was as short as 0.2 seconds.

Figure 10:
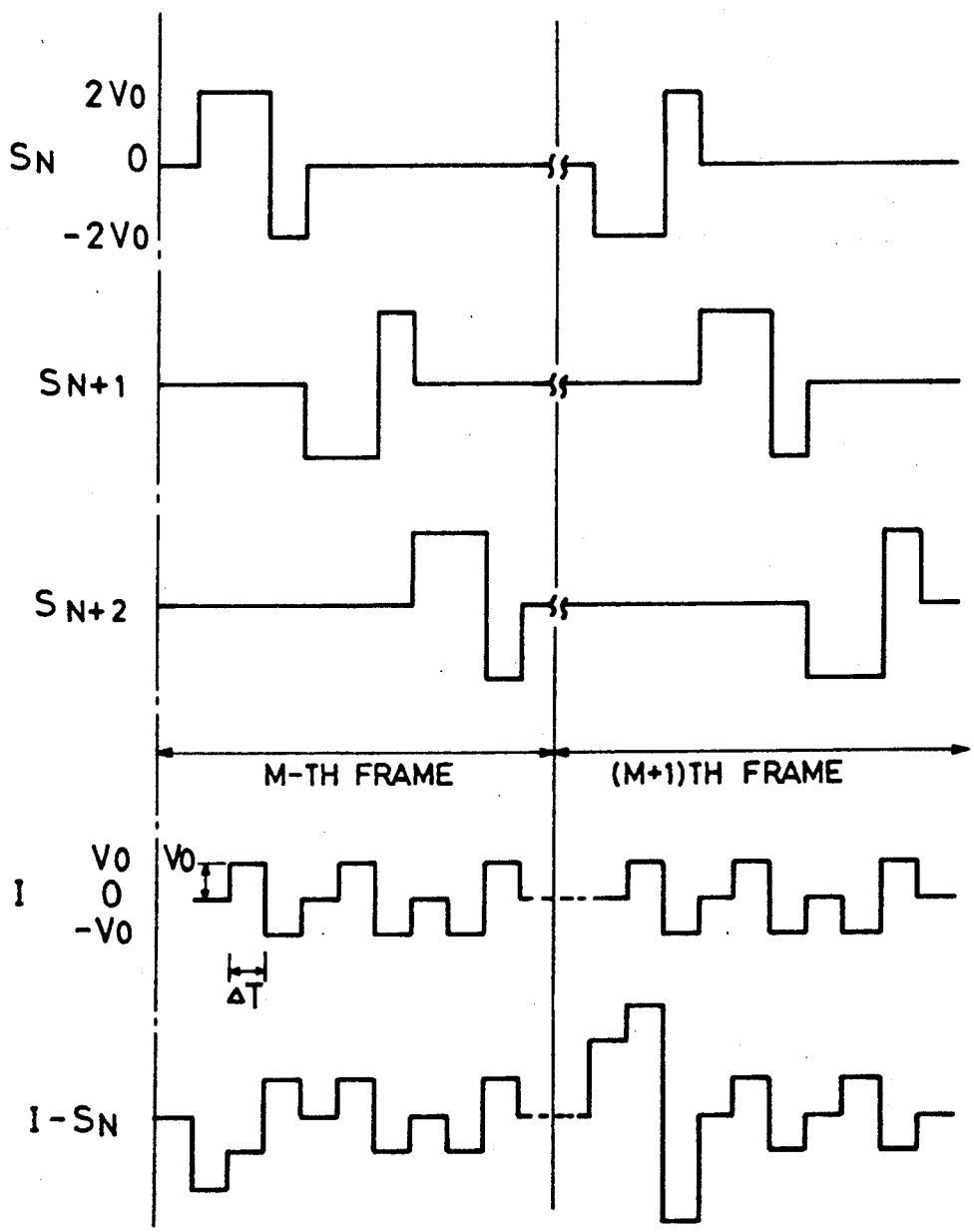
FIG. 10 is a waveform chart illustrative of the waveform of the driving voltage used in this embodiment of the present invention.

A multiplexing driving of this liquid crystal cell was conducted using the driving waveforms as shown in FIG. 10 which results in a display with a high quality of image and a high contrast. In this test, certain characters were input and displayed, after which the entire display area was erased to white state. No visible after image was observed after the extinction of the characters. In FIG. 10, $S_N$, $S_{N+1}$ and $S_{N+2}$ represent waveforms of voltages applied to the scanning lines, and I shows the waveform of a voltage applied to a representative data line. Thus, (I -$S_n$) represents the composite waveform obtained at the point of intersection of the data line I and the scanning line $S_N$. In this Example, the voltage $V_0$ was set to range between 5V and 8V, while the duration $\Delta T$ was set to be from 20 μsec to 70 μsec.

EXAMPLES 2 to 6

Liquid crystal cells were produced by the same process as Example 1, except for using orientation control films (polyimide molecules having mean molecular weight of 50,000) and the liquid crystal materials shown in Table 1 below.

The thus-produced liquid crystal cells were tested in the same manner as Example 1 for measurement of the contrast ratio and time of delay of optical response. The results are shown below in Table 2.

These liquid crystal cells were subjected to a same multiplexing driving display test conducted under the same conditions as Example 1. All these Examples showed superior display performance similar to that of Example 1.

TABLE 1

| Examples | Orientation control film (precursor polyamide acid) | Liquid crystal materials |
|---|---|---|
| 2 | [structure] | [CS1014] |
| 3 | [structure] | The same as above |
| 4 | [structure] | The same as above |
| 5 | [structure] | (LC - 1)$_{70}$/ (80B)$_{30}$ |

TABLE 1-continued

| Examples | Orientation control film (precursor polyamide acid) | Liquid crystal materials |
|---|---|---|
| 6 | [chemical structure: polymer with -HN-C(=O)-phenyl(CF3)(COOH)-O-phenyl-O-phenyl(CF3)(COOH)-C(=O)-NH-cyclohexyl-CH2-cyclohexyl- repeating unit] | The same as above |

TABLE 2

| Examples | Contrast ratio | Delay of optical response (sec) |
|---|---|---|
| 2 | 21:1 | 0.2 |
| 3 | 23:1 | 0.3 |
| 4 | 19:1 | 0.2 |
| 5 | 25:1 | 0.2 |
| 6 | 15:1 | 0.2 |

COMPARATIVE EXAMPLES 1 TO 4

Liquid crystal cells were produced in the same manner as Example 1 except that the orientation control films and liquid crystal materials shown in Table 3 below were used. The contrast ratio and the delay of optical response were measured on these liquid crystal cells to obtain the results shown in Table 4 below.

These liquid crystal cells were subjected to a multiplexing driving display test conducted under the same conditions as Example 1. These liquid crystal cells showed significantly smaller contrast ratio values than in those of Examples 1 to 6 produced in accordance with the invention. In addition, the significantly slower optical response characteristic provided that afterimage was observed in the Comparative Examples.

TABLE 3

| Comparative Examples | Orientation control film (polyamide acid varnish) | Liquid crystal material |
|---|---|---|
| 1 | SP-710 (commercial name of aromatic polyimide varnish produced by Toray industries)Ltd.) | CS1104 |
| 2 | The same as above | $(LC-1)_{70}(80B)_{30}$ |
| 3 | LQ-5200(commercial name of polyimide varnish produced by Hitachi Chemical Co., Ltd) | CS1104 |
| 4 | The same as above | $(LC-1)_{70}(80B)_{30}$ |

TABLE 4

| Comparative Examples | Contrast ratio | Delay of optical response(sec) |
|---|---|---|
| 1 | 8:1 | 1.5 |
| 2 | 7:1 | 2.5 |
| 3 | 10:1 | 1.2 |
| 4 | 8:1 | 2.2 |

A description will now be given of an embodiment of a display apparatus of the present invention which incorporates the liquid crystal device embodying the present invention.

Figure 11:
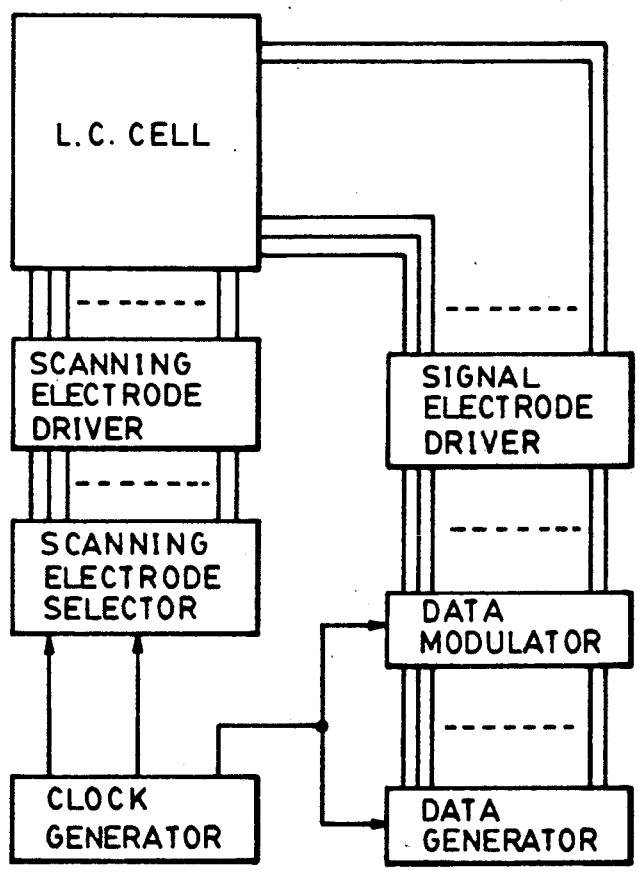
FIG. 11 is an illustration of an embodiment of the electric system of a display apparatus incorporating a liquid crystal device of the present invention.

FIG. 11 shows, in simplified form, one embodiment of electric system for driving a liquid crystal device of the invention mounted in a display apparatus wherein signals for the scanning electrodes are formed by sending clock signals CS (generated by a clock generator) to a scanning electrode selector (for selecting scanning electrodes) and then delivering the output from the scanning electrode selector to a scanning electrode driver. Signals DM for the signal electrodes are formed by delivering output signal DS (from a data generator) and clock signals CS to a data modulator. The data modulator can produce both data and auxiliary signals, which are then supplied to a signal electrode driver.

Figure 12A:
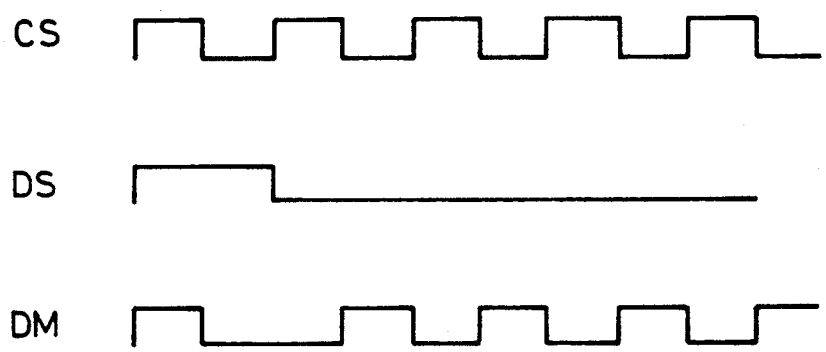
FIG. 12(A) illustrates signals derived from a data modulator of the electric system during the display apparatus is driven.
Figure 12B:
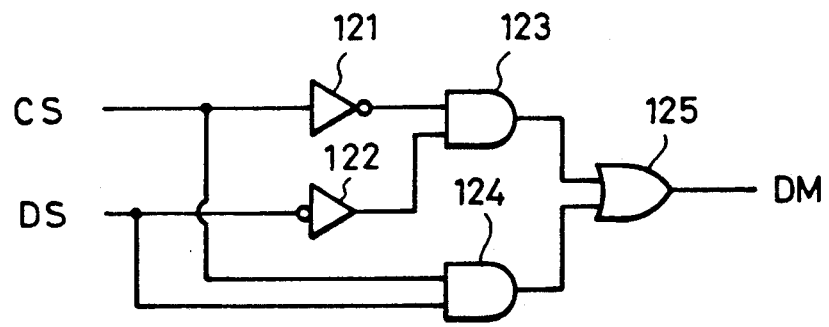
FIG. 12(B) is a schematic illustration of the data modulator of FIG. 12(A).

FIG. 12A shows Examples of signals output from the above-mentioned data modulator, and FIG. 12B schematically shows the data modulator for generating the signals shown in FIG. 12A. As is seen, the data modulator has a pair of inverters 121 and 122, a pair of AND circuits 123 and 124 and an OR circuit 125.

The described arrangement and method for driving the display apparatus incorporating the liquid crystal device of the invention are, of course, only illustrative.

As will be understood from the foregoing description, according to the present invention, a uniform orientation of the ferroelectric liquid crystal can be attained without requiring any treatment prior to application of A.C. driving power, by virtue of the use of the orientation film made from fluorine-containing alicyclic or aliphatic polyimide which is a critical feature of the present invention.

Furthermore, according to the present invention, it is possible to obtain a liquid crystal device which exhibits a high contrast between bright and dark states particularly in multiplexing driving mode and which can eliminate generation of after image.

It is therefore possible to obtain a display apparatus capable of displaying images with a high quality, by incorporating the liquid crystal device of the present invention.

We claim:

1. A liquid crystal device, comprising:
  a pair of substrates and a pair of orientation control films disposed on said substrates, said liquid crystal device further comprising a ferroelectric liquid crystal layer disposed between said pair of orientation control films, wherein both of said orientation control films comprise a fluorine-containing aliphatic or alicyclic polyimide.

2. A liquid crystal device according to claim 1, wherein said fluorine-containing aliphatic or alicyclic polyimide has a structural unit expressed by the following general formula [I]:

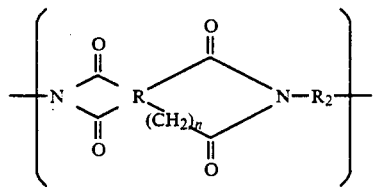

[I]

wherein $R_1$ is a tetravalent organic residue and $R_2$ is a divalent organic residue, at least one of $R_1$ and $R_2$ includes an alicyclic or aliphatic organic residue having fluorine and n is 0 or 1.

3. A liquid crystal device according to claim 1, wherein said fluorine-containing aliphatic polyimide has a structural unit expressed by the following formula [Ia]:

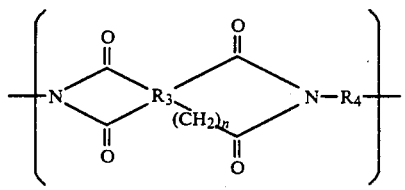

[Ia]

wherein $R_3$ is an aliphatic group and $R_4$ is an aromatic is 0 or 1.

4. A liquid crystal device according to claim 3, wherein $R_3$ is a fluorine-containing aliphatic group.

5. A liquid crystal device according to claim 3, wherein $R_4$ is a fluorine-containing aromatic group.

6. A liquid crystal device according to claim 2, wherein said fluorine-containing aliphatic polyimide has a structural unit expressed by the following formula [Ib]:

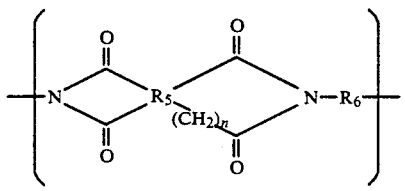

[Ib]

[Ib]

wherein $R_5$ is an aromatic group and $R_6$ is an aliphatic group, at least one of $R_5$ and $R_6$ containing fluorine and n is 0 or 1.

7. A liquid crystal device according to claim 6, wherein $R_5$ is a fluorine-containing aromatic group.

8. A liquid crystal device according to claim 6, wherein $R_6$ is a fluorine-containing aliphatic group.

9. A liquid crystal device according to claim 2, wherein said fluorine-containing alicyclic polyimide has a structural unit expressed by the following formula [Ic]:

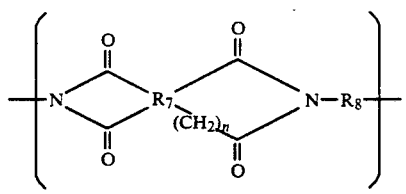

[Ic]

wherein $R_7$ is an aromatic group and $R_8$ is an alicycle, at least one of $R_7$ and $R_8$ containing fluorine and n is 0 or 1.

10. A liquid crystal device according to claim 9, wherein $R_7$ is a fluorine containing aromatic group.

11. A liquid crystal device according to claim 9, wherein $R_8$ is a fluorine-containing alicycle.

12. A liquid crystal device according to claim 2, wherein said fluorine-containing alicyclic polyimide contains a structural unit expressed by the following formula [Id]:

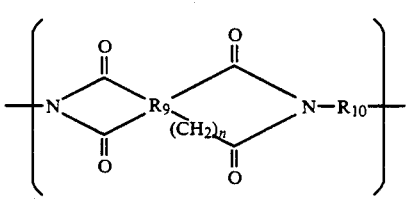

[Id]

wherein $R_9$ is an alicycle and $R_{10}$ is an aromatic group, at least one of $R_9$ and $R_{10}$ containing fluorine and n is 0 or 1.

13. A liquid crystal device according to claim 12, wherein $R_9$ is a fluorine-containing alicycle.

14. A liquid crystal device according to claim 12, wherein $R_{10}$ is a fluorine-containing aromatic group.

15. A liquid crystal device according to claim 2, wherein said fluorine-containing aliphatic polyimide contains a structural unit expressed by the following formula [Ie]:

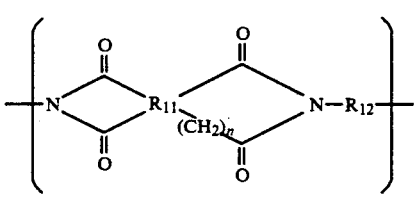

[Ie]

wherein $R_{11}$ and $R_{12}$ are aliphatic groups, at least one of $R_{11}$ and $R_{12}$ containing fluorine and n is 0 or 1.

16. A liquid crystal device according to claim 15, wherein $R_{11}$ is a fluorine-containing aliphatic group.

17. A liquid crystal device according to claim 15, wherein $R_{12}$ is a fluorine-containing aliphatic group.

18. A liquid crystal device according to claim 2, wherein said fluorine-containing aliphatic polyimide contains a structural unit expressed by the following formula [Ie]:

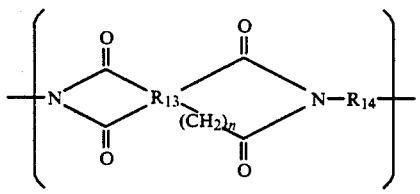

wherein $R_{13}$ is an aliphatic group, and $R_{14}$ is an alicycle, at least one of $R_{13}$ and $R_{14}$ containing fluorine and n is 0 or 1.

19. A liquid crystal device according to claim 18, wherein $R_{13}$ is a fluorine-containing aliphatic group.

20. A liquid crystal device according to claim 18, wherein $R_{14}$ is a fluorine-containing alicycle.

21. A liquid crystal device according to claim 2, wherein said fluorine-containing aliphatic polyimide contains a structural unit expressed by the following formula [Ig]:

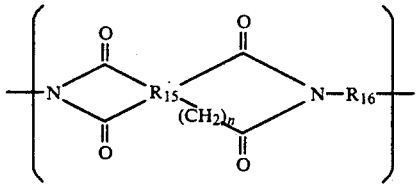

wherein $R_{15}$ is an alicycle, and $R_{16}$ is an aliphatic group, at least one of $R_{13}$ and $R_{14}$ containing fluorine and n is 0 or 1.

22. A liquid crystal device according to claim 21, wherein $R_{15}$ is a fluorine-containing alicycle.

23. A liquid crystal device according to claim 21, wherein $R_{16}$ is a fluorine-containing aliphatic group.

24. A liquid crystal device according to claim 1, wherein said orientation control film has a uni-axial orientation axis.

25. A liquid crystal device according to claim 24, wherein said uni-axial orientation axis has been realized by a rubbing treatment.

26. A liquid crystal device according to claim 1, wherein said orientation control film has a thickness ranging from 30 Å to 1 $\mu$.

27. A liquid crystal device according to claim 1, wherein said orientation control film has a thickness ranging from 200 Å to 300 Å.

28. A display apparatus, comprising:
   a liquid crystal device comprising a pair of substrates and a pair of orientation control films disposed on said substrates, said liquid crystal device further comprising a ferroelectric liquid crystal layer disposed between said pair of orientation control films, wherein both of said orientation control films comprise a fluorine-containing aliphatic or alicyclic polyimide; said liquid crystal device further comprising operatively connected means including:
   a clock generator means;
   a scanning electrode selector means;
   a scanning electrode driver means;
   a data generator means;
   a data modulator means; and
   a signal electrode driver means.

* * * * *

UNITED STATES PATENT AND TRADEMARK OFFICE
CERTIFICATE OF CORRECTION

PATENT NO. : 5,129,727
DATED : July 14, 1992
INVENTOR(S) : YUKIO HANYU, ET AL.

It is certified that error appears in the above-identified patent and that said Letters Patent is hereby corrected as shown below:

COLUMN 2

Line 11, "method non-spiral" should read --method using a rubbed polyimide film, is applied to the bistable non-spiral--.

COLUMN 4

Line 60, insert --Group A:--.

COLUMN 6

Line 47, "amonophenoxy" should read --aminophenoxy--.

COLUMN 8

Line 50, "$R_{13}$ and $R_{14}$" should read --$R_{15}$ and $R_{16}$--.

COLUMN 17

Line 29, "aromatic is" should read --aromatic group, at least one of $R_3$ and $R_4$ containing fluorine and n is--.
Line 51, delete fofrmula [Ib] (second occurrence).

COLUMN 18

Line 17, "fluorine containing" should read --fluorine-containing--.
Line 68, "[Ie]:" should read --[If]:--.

UNITED STATES PATENT AND TRADEMARK OFFICE
CERTIFICATE OF CORRECTION

PATENT NO. : 5,129,727
DATED : July 14, 1992
INVENTOR(S) : YUKIO HANYU, ET AL.

It is certified that error appears in the above-identified patent and that said Letters Patent is hereby corrected as shown below:

COLUMN 19

Line 33, "$R_{13}$ and $R_{14}$" should read --$R_{15}$ and $R_{16}$--.

Signed and Sealed this

Nineteenth Day of October, 1993

*Attest:*

BRUCE LEHMAN

*Attesting Officer*     *Commissioner of Patents and Trademarks*